(12) United States Patent
Park

(10) Patent No.: US 9,657,743 B2
(45) Date of Patent: May 23, 2017

(54) AIR CONDITIONER AND CONTROL METHOD THEREOF

(71) Applicant: SAMSUNG ELECTRONICS CO., LTD., Suwon-si (KR)

(72) Inventor: Seong Man Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 385 days.

(21) Appl. No.: 14/302,824

(22) Filed: Jun. 12, 2014

(65) Prior Publication Data

US 2014/0369805 A1    Dec. 18, 2014

(30) Foreign Application Priority Data

Jun. 12, 2013    (KR) .................. 10-2013-0066965

(51) Int. Cl.
*G06F 19/00*    (2011.01)
*F04D 27/00*    (2006.01)
*F24F 11/00*    (2006.01)
*G01J 5/02*    (2006.01)
*G01J 5/04*    (2006.01)
(Continued)

(52) U.S. Cl.
CPC ........ *F04D 27/001* (2013.01); *F24F 11/0034* (2013.01); *F24F 11/0078* (2013.01); *F24F 11/0079* (2013.01); *G01J 5/0025* (2013.01); *G01J 5/025* (2013.01); *G01J 5/047* (2013.01);
(Continued)

(58) Field of Classification Search
CPC ........... F24F 2011/0035; F24F 11/0078; F24F 11/0034; G06K 9/00362
See application file for complete search history.

(56) References Cited

U.S. PATENT DOCUMENTS 5,097,672 A * 3/1992 Takenaka .................. F24F 1/00
165/237
5,180,333 A * 1/1993 Shyu ........................ F24F 11/00
236/49.3
(Continued)

FOREIGN PATENT DOCUMENTS

JP    63-238530    10/1988
JP    4-181917     6/1992
(Continued)

OTHER PUBLICATIONS

Extended European Search Report dated Oct. 30, 2014 in corresponding European Patent Application No. 14158905.1.

*Primary Examiner* — Michael D Masinick
(74) *Attorney, Agent, or Firm* — Staas & Halsey LLP

(57) ABSTRACT

An air conditioner for determining whether a human body exists in a sensing region using a plurality of heat sensors, as human body-detecting sensors, installed in the air conditioner and arranged at regular intervals. The air conditioner recognizing, when a human body has been detected, angles formed between the human body-detecting sensors and the human body, and calculating a distance from the human body-detecting sensors to the human body based on the recognized angles and a distance between the human body-detecting sensors, and adjusting a direction and speed of wind according to the calculated distance to the human body, and a control method of the air conditioner. Also, the air conditioner may be used as a security sensor when it does not operate.

17 Claims, 17 Drawing Sheets

(51) Int. Cl.
*G01J 5/08* (2006.01)
*G01J 5/00* (2006.01)

(52) U.S. Cl.
CPC ....... *G01J 5/089* (2013.01); *F24F 2011/0035* (2013.01); *Y02B 30/746* (2013.01)

(56) References Cited

U.S. PATENT DOCUMENTS

| | | | | |
|---|---|---|---|---|
| 5,203,178 | A | * | 4/1993 | Shyu ................. F04C 28/28 417/14 |
| 5,815,078 | A | * | 9/1998 | Mun .................. F24F 11/0078 236/49.3 |
| 5,875,639 | A | * | 3/1999 | Kim .................. F24F 11/0078 236/51 |
| 5,899,807 | A | | 5/1999 | Kim et al. |
| 2009/0192399 | A1 | * | 7/2009 | Choi ................. A61B 5/02405 600/519 |
| 2014/0161312 | A1 | * | 6/2014 | Adachi .............. G06K 9/00362 382/103 |
| 2014/0374083 | A1 | * | 12/2014 | Lee ..................... F24F 11/0034 165/237 |
| 2015/0204556 | A1 | * | 7/2015 | Kusukame ........... F24F 11/0034 165/237 |

FOREIGN PATENT DOCUMENTS

| | | | | |
|---|---|---|---|---|
| JP | 07159235 | A | * | 6/1995 |
| JP | 08029555 | A | * | 2/1996 |
| JP | 10115447 | A | * | 5/1998 |
| JP | 2000234782 | A | * | 8/2000 |
| JP | 2006059015 | A | * | 3/2006 |
| JP | 2008215676 | A | * | 9/2008 |
| JP | 2008241428 | A | * | 10/2008 |
| JP | 2010-255948 | | | 11/2010 |
| WO | 2009/098847 | | | 8/2009 |
| WO | 2010/041300 | | | 4/2010 |
| WO | 2010/125615 | | | 11/2010 |

* cited by examiner

AIR CONDITIONER AND CONTROL METHOD THEREOF

CROSS-REFERENCE TO RELATED APPLICATIONS

This application claims the benefit of Korean Patent Application No. 2013-0066965, filed on Jun. 12, 2013 in the Korean Intellectual Property Office, the disclosure of which is incorporated herein by reference.

BACKGROUND

1. Field

Embodiments of the present disclosure relate to an air conditioner capable of measuring a distance to a human body using human body-detecting sensors and adjusting the speed and direction of wind based on the distance to the human body, and a control method thereof.

2. Description of the Related Art

Conventional air conditioners operate regardless of the locations of human bodies. However, adjusting the direction and strength of wind according to the locations of human bodies will be effective for energy saving. Accordingly, concerns about a technology for recognizing the locations of human bodies and adjusting the direction and strength of wind according to the locations of the human bodies are increasing.

In general, human body-detecting technologies sense the locations and motions of human bodies using an image camera or a heat sensor.

Human body-detecting methods using an image camera can acquire various information about the locations, motions, etc. of human bodies, however, require a microcontroller unit (MCU) having advanced specifications as well as a camera since they use an image recognition technology.

The heat sensor can be classified into a three-dimensional (3D) warning type and a surface warning type.

The 3D warning type heat sensor includes a fixed human body-detecting sensor, and can detect only motion of a human body in a sensing region.

The surface warning type heat sensor can detect even an angle formed between a human body-detecting sensor and a human body who exists in a sensing region although supplementary equipment for rotating the human body-detecting sensor in the sensing region is needed.

SUMMARY

Therefore, it is an aspect of the present disclosure to provide an air conditioner capable of adjusting the speed and direction of wind according to the location of a human body, and a control method thereof.

It is another aspect of the present disclosure to provide an air conditioner that can be used as a security sensor.

Additional aspects of the disclosure will be set forth in part in the description which follows and, in part, will be obvious from the description, or may be learned by practice of the disclosure.

In accordance with one aspect of the present disclosure, an air conditioner includes: a plurality of human body-detecting sensors configured to detect a human body; a blade configured to change a direction of wind; a blow fan configured to change a speed of wind; and a controller configured to perform a first sensing mode for detecting a human body, to perform a second sensing mode in which a narrower region than in the first sensing mode is monitored when a human body has been detected, and to adjust, when a human body has been detected in the second sensing mode, a direction and speed of wind according to a direction in which the human body is positioned and a distance from the human body-detecting sensors to the human body.

A first sensing region in which a human body is detected in the first sensing mode may be a fixed relatively wide region, and a second sensing region in which a human body is detected in the second sensing mode may be a part of the first sensing region, and may be a relatively narrow sensing region whose location changes in a tangential direction over time.

In accordance with another aspect of the present disclosure, an air conditioner includes: a plurality of human body-detecting sensors configured to detect a human body; a blade configured to change a direction of wind; a blow fan configured to change a speed of wind; a liquid crystal unit configured to block or transmit rays emitted from a human body; a current applying unit configured to apply current to the liquid crystal unit or to block current that is applied to the liquid crystal unit; and a controller configured to perform a first sensing mode for detecting a human body, to perform a second sensing mode in which a narrower region than in the first sensing mode is monitored when a human body has been detected, and to adjust, when a human body has been detected in the second sensing mode, a direction and speed of wind according to a direction in which the human body is positioned and a distance from the human body-detecting sensors to the human body.

The liquid crystal unit may be divided into a plurality of sections, and the liquid crystal unit may form a first sensing region by transmitting rays emitted from a human body when current is no longer applied to all the sections of the liquid crystal unit, and may form a second sensing region when current is applied to all the sections of the liquid crystal unit and then current applied to a section of the liquid crystal unit is blocked.

The first sensing region in which a human body is detected in the first sensing mode may be a fixed relatively wide sensing region, and a second sensing region in which a human body is detected in the second sensing mode may be a part of the first sensing region, and may be a relatively narrow sensing region whose location changes in a tangential direction over time.

The air conditioner may further include a reflector configured to reflect rays emitted from a human body and transfer the reflected rays to the human body-detecting sensors.

The air conditioner may further include a communication unit, wherein when a human body has been detected in the first sensing region, the communication unit notifies a user of the fact that a human body has been detected.

In accordance with another aspect of the present disclosure, a control method of an air conditioner includes: determining whether a human body exists in a first sensing region; when a human body has been detected in the first sensing region, determining whether a human body exists in a second sensing region having a narrower width than that of the first sensing region; and when a human body has been detected in the second sensing region, setting a direction and speed of wind according to a direction in which the human body is positioned and a distance from the human body-detecting sensors to the human body.

The control method may further include at a rotary motor, reciprocatingly rotating the human body-detecting sensors in a tangential direction in the second sensing mode.

A first sensing region in which a human body is detected in the first sensing mode may be a fixed relatively wide region, and a second sensing region in which a human body is detected in the second sensing mode may be a part of the first sensing region, and may be a relatively narrow sensing region whose location changes in a tangential direction over time.

In accordance with another aspect of the present disclosure, a control method of an air conditioner includes: at a liquid crystal unit, blockings or transmitting rays emitted from a human body; at a current applying unit, applying current to the liquid crystal unit or blocking current that is applied to the liquid crystal unit; determining whether a human body exists in a first sensing region in a first sensing mode; switching the first sensing mode to a second sensing mode when a human body has been detected, the second sensing mode in which a narrower region than in the first sensing mode is monitored; when a human body has been detected in the second sensing mode, recognizing a direction in which the human body is positioned and calculating a distance to the human body; and setting a direction and speed of wind according to the direction in which the human body is positioned and the distance to the human body.

The liquid crystal unit may be divided into a plurality of sections, and the liquid crystal unit may form a first sensing region by transmitting rays emitted from a human body when current is no longer applied to all the sections of the liquid crystal unit, and may form a second sensing region when current is applied to all the sections of the liquid crystal unit and then current applied to a section of the liquid crystal unit is blocked.

A first sensing region in which a human body is detected in the first sensing mode may be a fixed relatively wide region, and a second sensing region in which a human body is detected in the second sensing mode may be a part of the first sensing region, and may be a relatively narrow sensing region whose location changes in a tangential direction over time.

The control method may further include, at a reflector, reflecting rays emitted from a human body and transferring the reflected rays to the human body-detecting sensors.

The control method may further include at a communication unit, notifying, when a human body has been detected in the first sensing region, a user of the fact that a human body has been detected.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
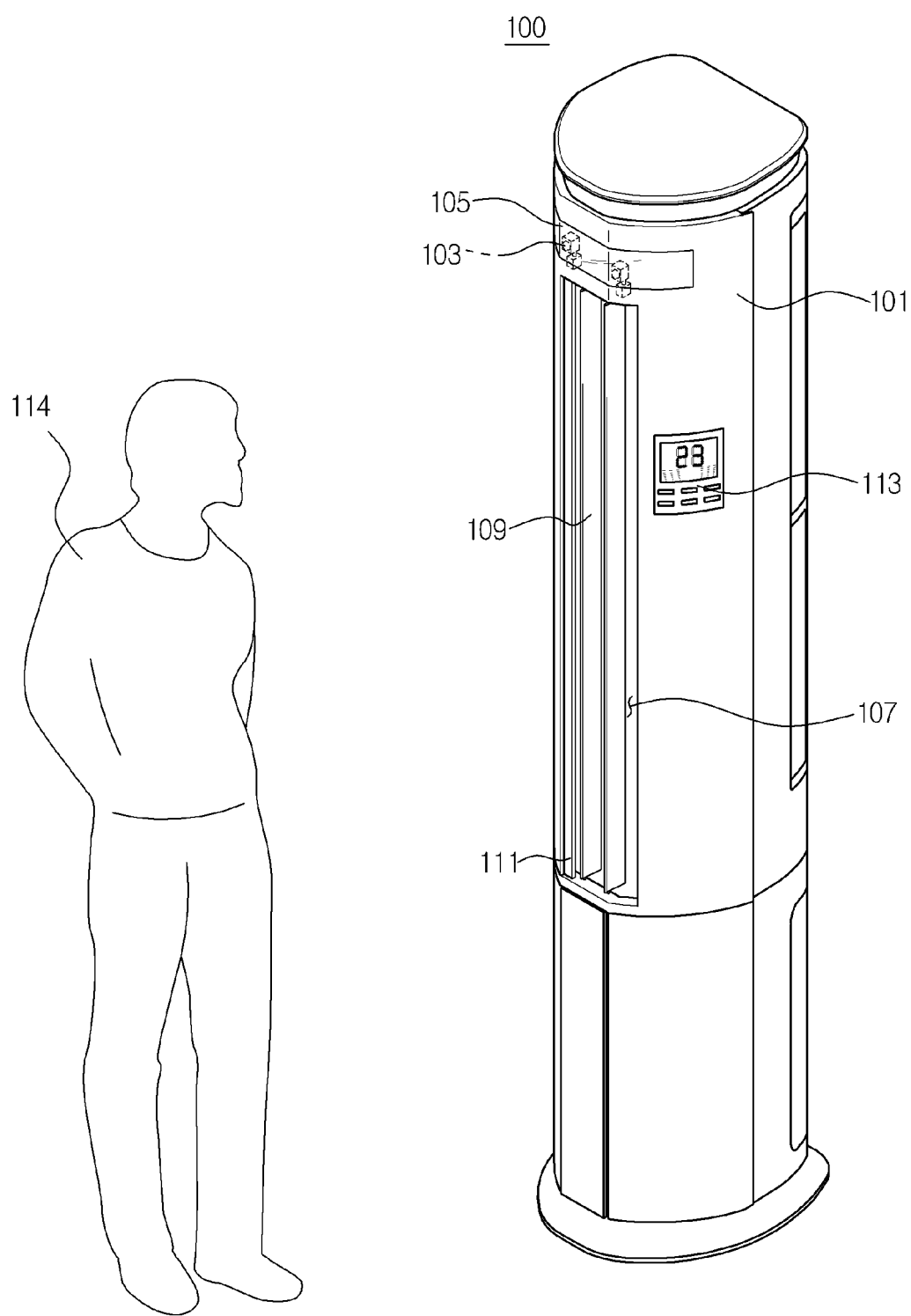
FIG. 1 is a perspective view of an air conditioner according to an exemplary embodiment of the present disclosure.

Reference will now be made in detail to the embodiments of the present disclosure, examples of which are illustrated in the accompanying drawings, wherein like reference numerals refer to like elements throughout.

Hereinafter, exemplary embodiments of an air conditioner and a control method thereof will be described in detail with reference to the appended drawings.

Figure 2:
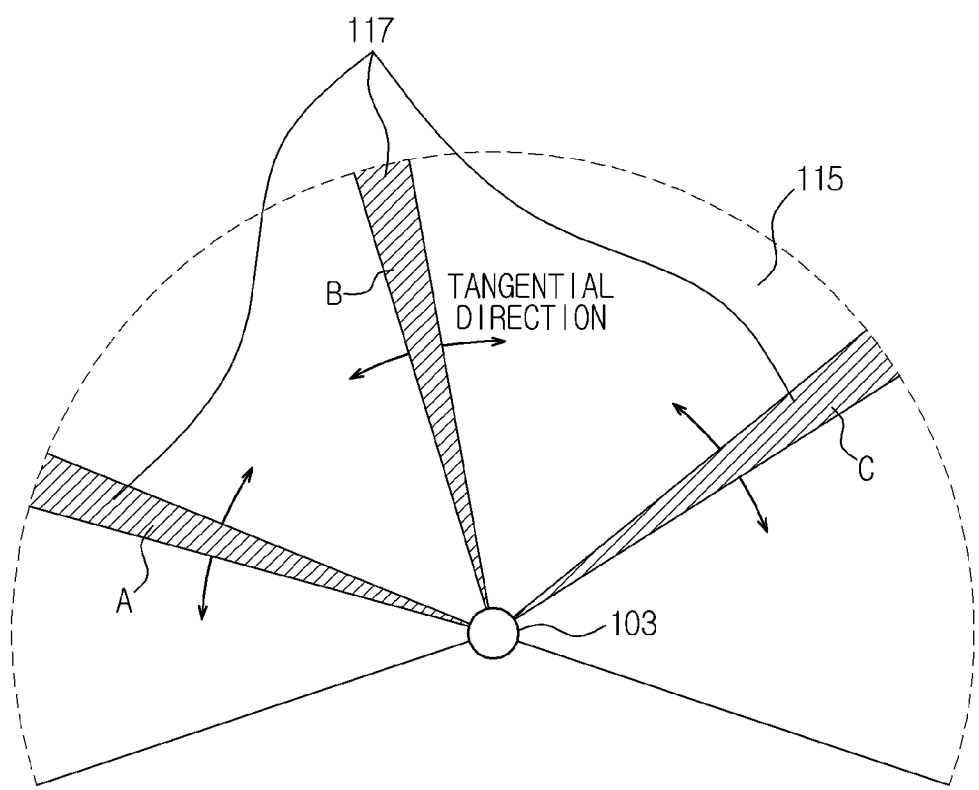
FIG. 2 illustrates a sensing region of the air conditioner illustrated in FIG. 1.

FIG. 1 is a perspective view of an air conditioner 100 according to an exemplary embodiment of the present disclosure, and FIG. 2 illustrates a sensing region of the air conditioner 100 illustrated in FIG. 1.

Referring to FIG. 1, the air conditioner 100 includes a housing 101 forming the external appearance of the air conditioner 100, a human body-detecting sensor 103 installed in the front, upper portion of the housing 101, a moving object detecting lens 105 disposed in front of the human body-detecting sensor 103 and configured to collect heat, an air outlet 107 located below the moving object sensing lens 105, blades 109 arranged across the air outlet 107 and configured to change the direction of wind, a shutter 111 configured to open or close the air outlet 107, and an input unit 113 located to the left of the air outlet 107.

The human body-detecting sensor 103 includes a heat sensor. The heat sensor may sense the wavelengths of rays generated from heat of a human body 114.

The human body-detecting sensor 103 may consist of a plurality of human body-detecting sensors. When three or more human body-detecting sensors 103 are provided, the human body-detecting sensors 103 may be arranged at regular intervals.

The reason why a plurality of human body-detecting sensors are used is because a distance to a human body can be calculated using a plurality of human body-detecting sensors. A method in which a distance to a human body is calculated using a plurality of human body-detecting sensors will be described in detail, later.

Also, as the number of human body-detecting sensors increases, a more accurate distance to a human body can be calculated. More specifically, as the number of human body-detecting sensors increases, more angular information is acquired so that more data about a distance to a human body can be acquired based on the angular information. By correcting the data about the distance to the human body to reduce an error range, an accurate distance to the human body can be obtained.

However, in the current exemplary embodiment, for convenience of description, it is assumed that the air conditioner 100 includes two human body-detecting sensors 103.

The human body-detecting sensors 103 are arranged at predetermined locations, and may be fixed or rotate as necessary.

A sensing region of the human body-detecting sensors 103 may include, as illustrated in FIG. 2, a first sensing region 115 which is a relatively wide sensing region, and a second sensing region 117 which is a part of the first sensing region 115.

The first sensing region 115 is a wide sensing region in which presence/absence of the human body 114 is determined when the human body-detecting sensors 103 are fixed. The second sensing region 117 is set when the human body-detecting sensors 103 have detected a human body 114 in the first sensing region 115. The second sensing region 117, which has a predetermined width, moves in a tangential direction of the first sensing region 115 so as to acquire data for calculating a distance from the human body-detecting sensors 103 to the human body 114. Accordingly, the location of the second sensing region 117 changes over time although the area of the second sensing region 117 is constant.

A change in location of the second sensing region 117 will be described based on regions A, B, and C illustrated in FIG. 2, below.

Referring to FIG. 2, the second sensing region 117 moves from the region A to the region B, from the region B to the region C, then from the region C to the region B, and from the region B to the region A.

Referring again to FIG. 1, the moving object sensing lens 105 is positioned with a convex shape on the front side of the housing 101. The moving object sensing lens 105 collects rays generated from heat of the human body 114, and directs the collected rays to the human body-detecting sensors 103.

The shutter 111 opens or closes the air outlet 107. More specifically, the shutter 111 closes the air outlet 107 when the air conditioner 100 is turned off, and when the air conditioner 100 is turned on, the shutter 111 slides to the inside of the housing 101 to open the air outlet 107.

The input unit 113 allows a user to input a driving command to the air conditioner 100, and includes a plurality of buttons. A user may set a wind direction, a wind speed, a temperature, etc. of the air conditioner 100 through the input unit 113, and may also select an operating mode, a power save mode, a security mode, etc. through mode setting.

The operating mode is a mode for operating the air conditioner 100. That is, when the operating mode is selected, the air conditioner 100 operates.

The power save mode is selectively set when the air conditioner 100 is in the operating mode so as to adjust a wind speed, or to save energy by adjusting a temperature.

The security mode is a mode for monitoring presence of a human body through the human body-detecting sensors 103 installed in the air conditioner 100, and when a human body has been detected in the sensing region, notifying a user of the fact that a human body has been detected through the user's communication terminal.

Figure 3:
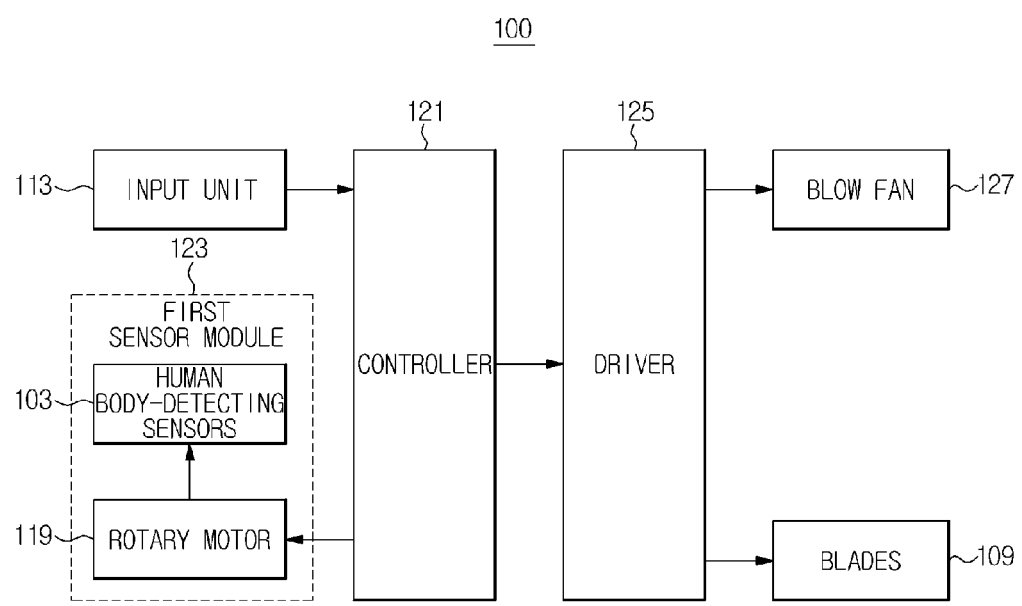
FIG. 3 is a block diagram of the air conditioner illustrated in FIG. 1.

FIG. 3 is a block diagram of the air conditioner 100 illustrated in FIG. 1.

Referring to FIG. 3, the air conditioner 100 includes, in addition to the components illustrated in FIG. 1, a first sensor module 123, a blow fan 127 installed in the housing 101, a driver 125 to drive the blades 109 and the blow fan 127, and a controller 121 to control operations of the air conditioner 100. The first sensor module 123 includes the human body-detecting sensors 103, and a rotary motor 119 to rotate the human body-detecting sensors 103.

The rotary motor 119 may be a variable reluctance type stepping motor having a high rotating angle resolution. This type of the rotary motor 119 can freely realize a swing mode requiring a continuous direction conversion as well as stepwise direction conversion of the human body-detecting sensors 103. However, any other power-generating device can be used so long as it can realize the continuous direction conversion and the stepwise direction conversion of the human body-detecting sensors 103.

When the human body-detecting sensors 103 are 3D warning type heat sensors, the human body-detecting sensors 103 are fixed to monitor a wide range, and require no separate rotary motor. However, the human body-detecting sensors 103 may only detect whether or not a human body's motion occurs in a sensing region.

However, when the human body-detecting sensors 103 are surface warning type heat sensors, the human body-detecting sensors 103 may need to be rotated since they have narrow sensing regions, and accordingly, the human body-detecting sensors 103 may require a rotary motor 119 as supplementary equipment.

The blades 109 are provided to change the direction of wind. Each blade 109 may rotate with respect to its rotation shaft so as to change the direction of wind in a left-right direction.

The blow fan 127 changes the strength of wind. When the human body 114 is positioned close to the human body-detecting sensors 103, the blow fan 127 may reduce Revolution Per Minute (RPM) to lower the speed of wind to be discharged through the air outlet 107. Also, when the human body 114 is far away from the human body-detecting sensors 103, the blow fan 127 may increase RPM to increase the speed of wind to be discharged through the air outlet 107.

The controller 121 controls the air conditioner 100 according to a control command input through the input unit 113, calculates a distance from the human body-detecting sensors 103 to the human body 114 based on the results of sensing by the human body-detecting sensors 103, and adjusts the direction and speed of wind according to the distance to the human body.

The controller 121 sets a sensing mode of the human body-detecting sensors 103 according to the results of the sensing by the human body-detecting sensors 103, and adjusts the operation and sensing region of the human body-detecting sensors 103 according to the sensing mode.

When a first sensing mode is set, the human body-detecting sensors 103 are fixed and monitor the first sensing region 115 (see FIG. 2), and when a second sensing mode is set, the human body-detecting sensors 103 monitor the second sensing region 117 (see FIG. 2) while rotating with respect to their rotating shafts.

The human body-detecting sensors 103 are set to the first sensing mode in a normal state, and when the human body-detecting sensors 103 have detected a human body in the first sensing mode, the human body-detecting sensors 103 enter the second sensing mode. In the second sensing mode, each human body-detecting sensor 103 is reciprocatingly rotated in the left-right direction by the rotary motor 119 in the first sensing region 115 to monitor the first sensing region 115.

When the human body-detecting sensors 103 have detected the human body 114, the controller 121 may calculate angles formed between the human body-detecting sensors 103 and the human body 114, and calculate a distance from the human body-detecting sensors 103 to the human body 114 based on the calculated angles.

Figure 4:
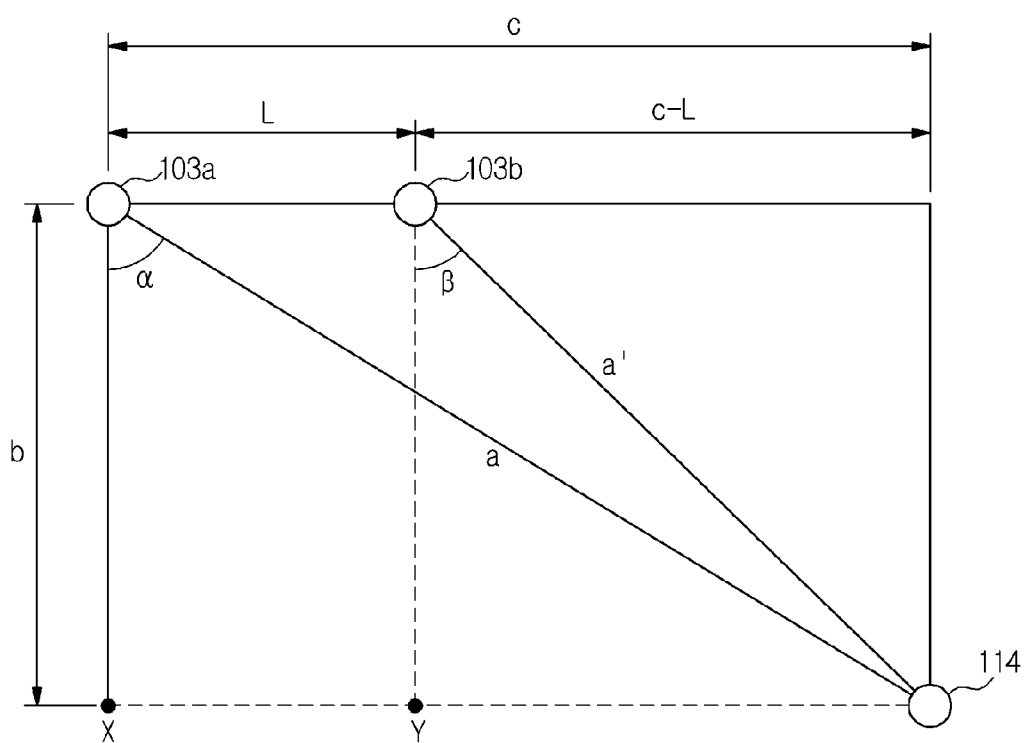
FIG. 4 is a view for describing a method in which an air conditioner measures a distance to a human body using a trigonometrical function based on a stereo method.

A method in which the controller 121 calculates a distance from the human body-detecting sensors 103 to the human body 114 will be described with reference to FIG. 4, below. Referring to FIG. 4, the controller 121 calculates a distance to the human body 114 using a trigonometrical function based on a stereo method.

In FIG. 4, L represents a distance between a first sensor 103a and a second sensor 103b that are the human body-detecting sensors 103, b represents a perpendicular distance between a straight line connecting the first sensor 103 and the second sensors 103b and another straight line that is parallel to the straight line and passes through the human body 114, a represents a distance from the first sensor 103a to the human body 114, a' represents a distance from the second sensor 103b to the human body 114, X and Y represent points at which perpendicular lines falling from the first and second sensors 103 and 103b on the other straight line that is parallel to the straight line connecting the first and second sensors 103a and 103b and passes through the human body 114 meet the other straight line passing through the human body 114, α represents an angle formed by the human body 114, the first sensor 103a, and the point X, and β represents an angle formed by the human body 114, the second sensor 103b, and the point Y.

In FIG. 4, since $\sin(\alpha)=c/a$, $\cos(\alpha)=b/a$, and $\tan(\alpha)=c/b$, $b=c/\tan(\alpha)$. Also, since $\sin(\beta)=(c-L)/a'$, $\cos(\beta)=b/a'$ and $\tan(\beta)=(c-L)/b$, $b=(c-L)/\tan(\beta)$.

Then, since $c=L*\tan(\alpha)/\{\tan(\alpha)-\tan(\beta)\}$ and $b=c/\tan(\alpha)$, the location of the human body 114 can be obtained in the x and y coordinate system on the sensing region.

After the location of the human body 114 is obtained using the above equations, the controller 121 changes the direction of the blades 109 to change the direction of wind, and changes RPM of the blow fan 127 to change the speed of wind, according to the location of the human body 114.

Figure 5:
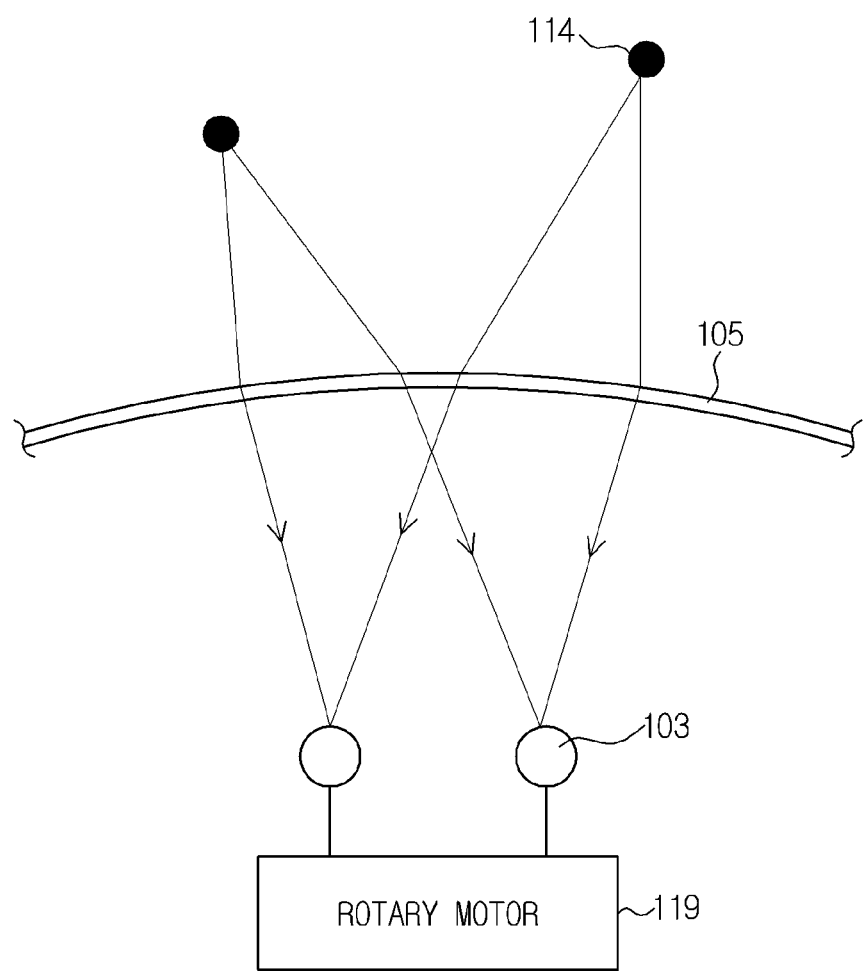
FIG. 5 is a conceptual view for describing a process in which rays generated from heat of human bodies arrive at human body-detecting sensors of the air conditioner illustrated in FIG. 1.
Figure 6:
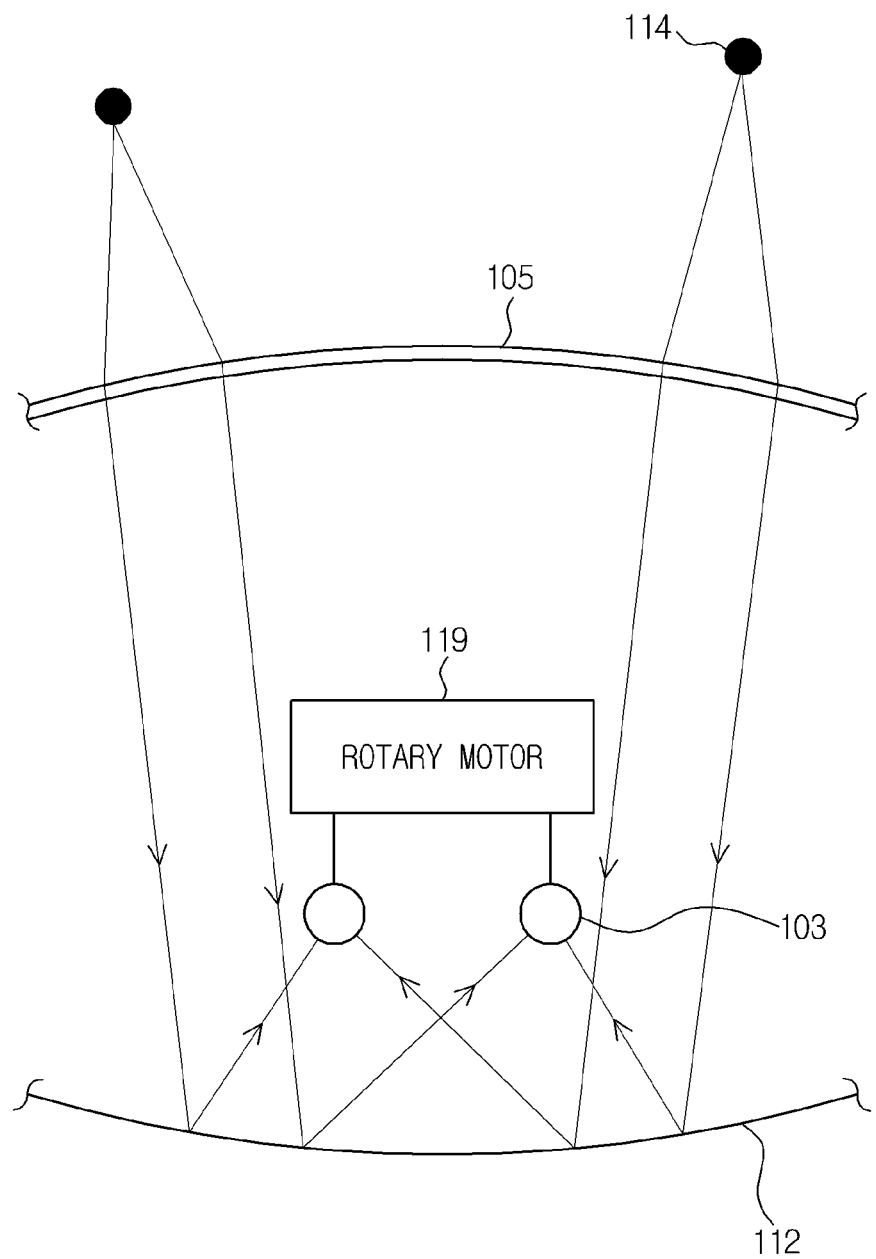
FIG. 6 is a conceptual view for describing a process in which rays generated from heat of human bodies arrive at human body-detecting sensors of the air conditioner illustrated in FIG. 1 via a reflector.

FIGS. 5 and 6 are views for describing a process in which rays generated from heat of the human bodies 114 are collected by the moving object sensing lens 105, and the collected rays are transferred to the human body-detecting sensors 103 in detail. An example of FIG. 6 is different from an example of FIG. 5 in that a reflector 112 is used.

Referring to FIG. 5, the sensing surfaces of the human body-detecting sensors 103 face the moving object sensing lens 105. Accordingly, rays generated from the human bodies 114 are transmitted through and collected by the moving object sensing lens 105, and then, the collected rays are directly transferred to the human body-detecting sensors 103.

Referring to FIG. 6, since the reflector 112 is provided behind the human body-detecting sensor 103, the sensing surfaces of the human body-detecting sensors 103 face the reflector 112, instead of the moving object sensing lens 105. Accordingly, rays generated from heat of the human bodies 114 are transmitted through and collected by the moving object sensing lens 105, the collected rays are reflected by the reflector 112, and then the reflected rays are transferred to the human body-detecting sensor 103.

The reflector 112 may be made of solar reflective glass. The solar reflective glass is fabricated by applying a thin material film having excellent solar reflexibility to the surface of glass, and the solar reflective glass may be plate glass fabricated by surface coloring of coating with metal oxide using baking or the like.

Figure 7:
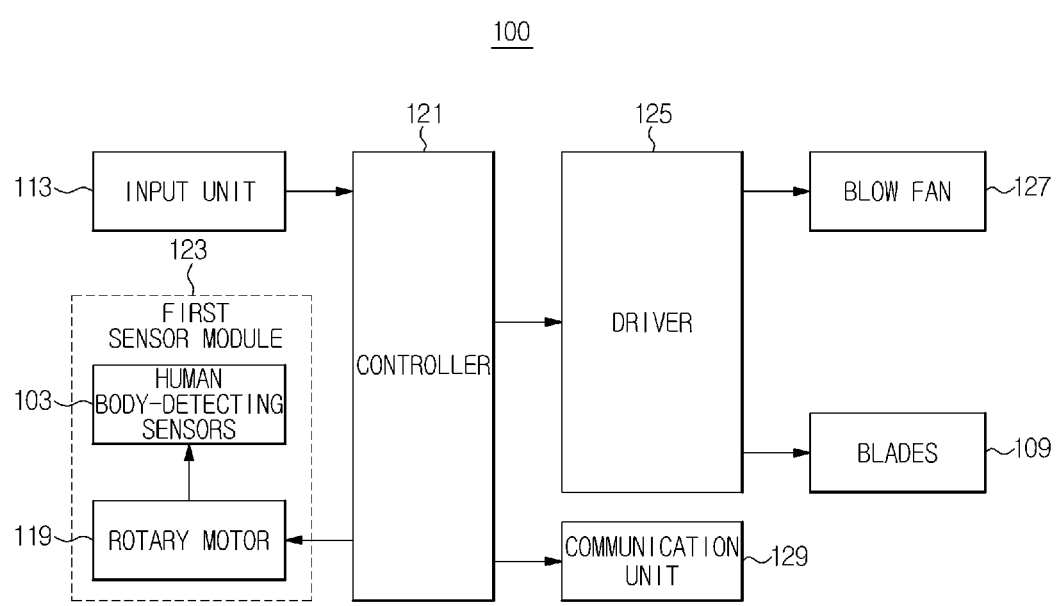
FIG. 7 is a block diagram of an air conditioner including a sensor module, which is used as a security sensor, according to an exemplary embodiment of the present disclosure.

FIG. 7 is a block diagram of an air conditioner 100 which is used as a security sensor, according to an exemplary embodiment of the present disclosure.

As illustrated in FIG. 7, the air conditioner 100 may include a communication unit 129 to notify a user of the fact that a human body has been detected in a sensing region, in addition to the components illustrated in FIG. 3. Accordingly, the air conditioner 100 may be used as a security sensor.

When a security mode is set, the human body-detecting sensors 103 may operate in the same way as the first sensing mode since only whether or not a human body exists in the sensing region is important information, and accordingly, further descriptions thereof will be omitted.

The communication unit 129 provides a user with information about whether a human body exists in the sensing region. Recently, many kinds of home appliances have evolved to smart home appliances having a communication function, and the air conditioner 100 according to the current exemplary embodiment is an example of such a smart home appliance.

The communication unit 129 may communicate with a user's terminal through wireless communication, e.g., WiFi communication, Bluetooth communication, Near Field Communication (NFC), Infrared (IR) communication, WiBro communication, and Zigbee communication.

Figure 8:
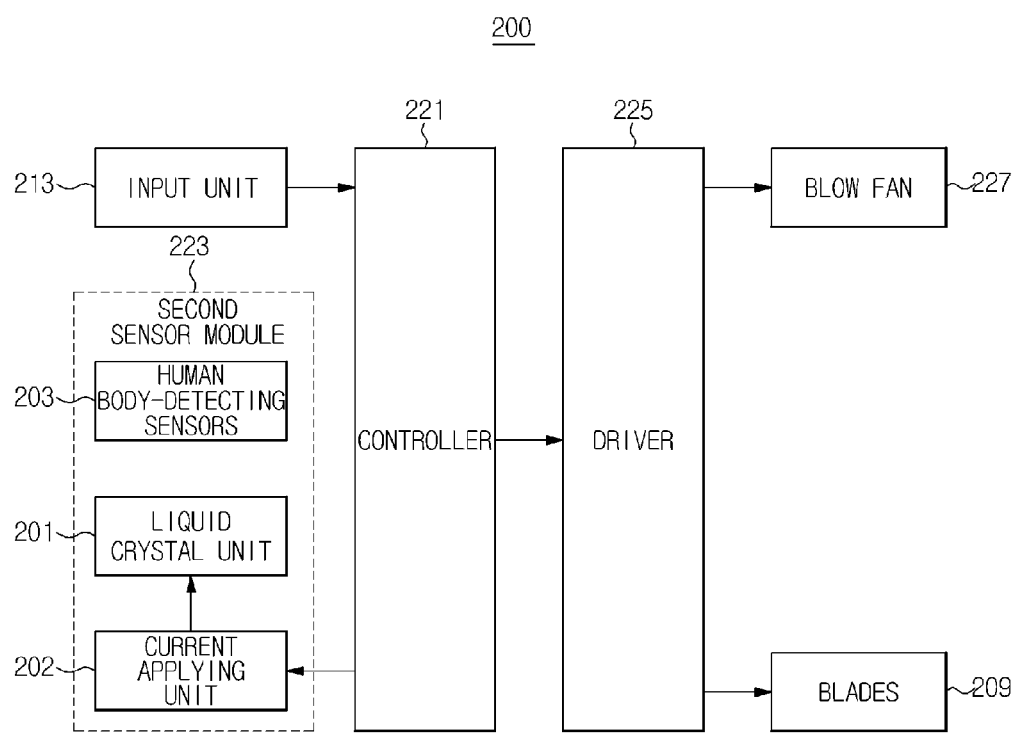
FIG. 8 is a block diagram of an air conditioner including a sensor module having a different configuration from the sensor module illustrated in FIG. 3, according to another exemplary embodiment of the present disclosure.

FIG. 8 is a block diagram of an air conditioner 200 including a sensor module having a different configuration from the sensor module 123 illustrated in FIG. 3, according to another exemplary embodiment of the present disclosure.

Referring to FIG. 8, the air conditioner 200 includes an input unit 213, a second sensor module 223, blades 209, a blow fan 227 installed in a housing, a driver 225 to drive the blades 209 and the blow fan 227, and a controller 221 to control operations of the air conditioner 200.

The second sensor module 223 includes a human body-detecting sensor 203 to recognize rays emitted from a human body, a liquid crystal unit 201 to receive or block rays emitted from the human body and directed to the human body-detecting sensor 203, and a current applying unit 202 to open or close the liquid crystal unit 201.

Figure 9:
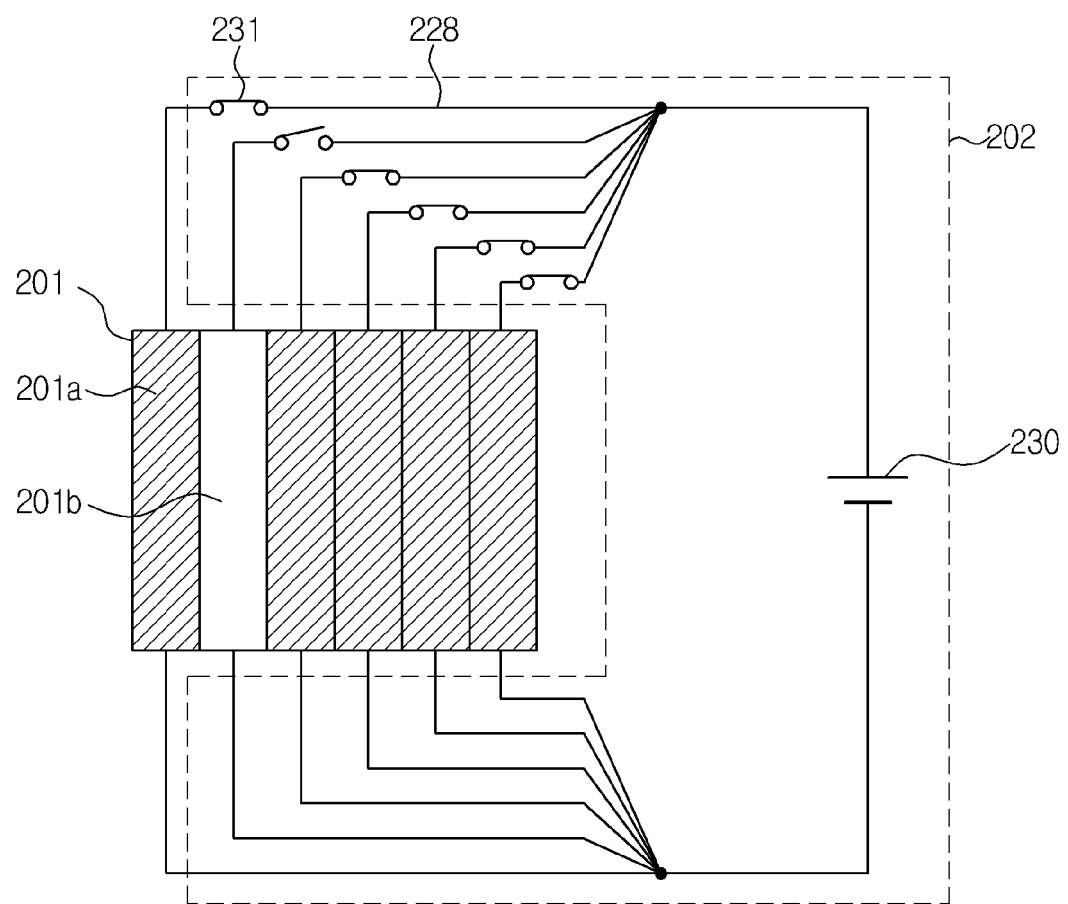
FIG. 9 is a configuration view illustrating a liquid crystal unit and a current applying unit of the sensor module illustrated in FIG. 8.

A configuration of the liquid crystal unit 201 and the current applying unit 202 of the second sensor module 223 is illustrated in FIG. 9.

As illustrated in FIG. 9, the liquid crystal unit 201 is disposed in front of the human body-detecting sensors 203, includes transparent liquid crystals, and is partitioned at regular intervals, and the current applying unit 202 is provided around the liquid crystal unit 201.

The liquid crystal unit 201 may be divided into several tens or hundreds of sections. The reason why the liquid crystal unit 201 is divided into a plurality of sections is to detect a more accurate location at which a human body exists, which leads to heat sensing with higher resolution. However, since the present disclosure is aimed at determining a direction in which a human body exists so as to change the direction of wind, high resolution of heat sensing is not required. Accordingly, the number of sections into which the liquid crystal unit 201 is divided is appropriately decided in consideration of economic efficiency.

A liquid crystal is a material which is intermediate in structure between a liquid and a crystal. Liquid crystals are in a liquid state having an irregular molecule arrangement in a specific direction, but in a crystal state having a regular molecule arrangement in another direction.

The liquid crystal unit 201 can transmit heat therethrough when no current is supplied so that liquid crystals become transparent. However, when a small amount of current of several nanoamperes flows through the liquid crystal unit 201, the liquid crystal unit 201 may block heat since the transparent sections 201a of liquid crystals become opaque. That is, as illustrated in FIG. 9, the transparent sections 201a to which current is no longer applied transmit heat, whereas an opaque section 201b to which a small amount of current is supplied blocks heat.

The current applying unit 202 controls flow of current to the liquid crystal unit 201. The current applying unit 202 includes a plurality of leads 228 connected to the respective sections of the liquid crystal unit 201 to allow current to independently flow through the respective sections, a plurality of switches 231 to independently block current that is supplied to the respective sections, and a power supply 230 to supply the current.

The current applying unit 202 controls rays emitted from a human body, collected by the human body-detecting sensors 203 in such a manner to block current that is applied to all the sections of the liquid crystal unit 201 or to apply current to all the sections of the liquid crystal unit 201 and then sequentially block the current applied to the individual sections of the liquid crystal unit 201 starting from the first section. Thereby, the current applying unit 202 performs the same function as rotation of the human body-detecting sensors 103 by the rotary motor 119.

The exemplary embodiment of the air conditioner 200 as described above has advantages of no noise and low costs since it uses a method of applying current to the liquid crystal unit 201.

Figure 10:
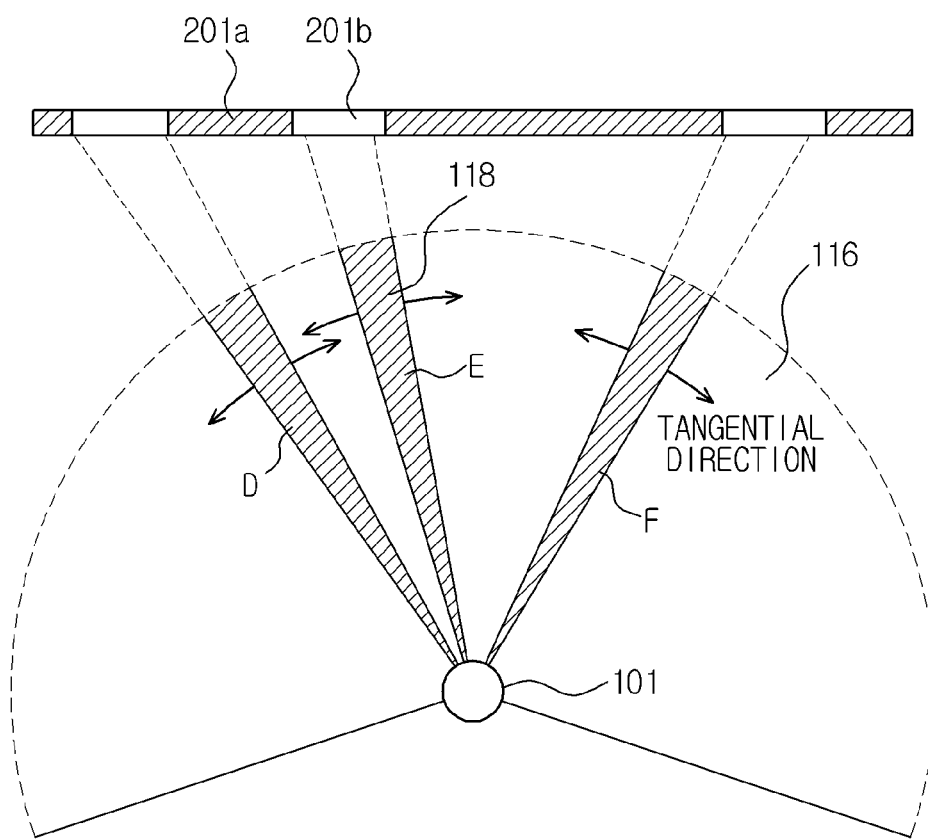
FIG. 10 illustrates a sensing region of the air conditioner illustrated in FIG. 8.

When the human body-detecting sensors 203 are fixed without rotating in the state in which current that is applied to the liquid crystal unit 201 is blocked so that the liquid crystal unit 201 becomes transparent, the human body-detecting sensors 203 monitor a first sensing region (116 of FIG. 10). Also, by adjusting current that is applied to the liquid crystal unit 201, the sensing region of the human body-detecting sensors 203 may be adjusted.

A method of adjusting the sensing region of the human body-detecting sensors 203 will be described with reference to FIG. 10, below.

As illustrated in FIG. 10, the sensing region of the human body-detecting sensors 203 will include a first sensing region 116 which is a relatively wide sensing region, and a second sensing region 118 which is a part of the first sensing region 116.

The first sensing region 116 is a wide sensing region having a fan shape in which presence/absence of a human body is determined when no current is applied to the liquid crystal unit 201 and the human body-detecting sensors 203 are fixed.

The second sensing region 118 is a region of a fan shape having a narrow sensing width in which the wavelengths of incident rays are sensed when current that is applied to specific opaque sections 201b (see FIG. 9) of the liquid crystal unit 201 is blocked so that rays emitted from heat of a human body are incident to the transparent sections 201a of the liquid crystal unit 201. More specifically, when the human body-detecting sensors 203 detect a human body while monitoring the first sensing region 116, the controller 221 adjusts flow of current to the liquid crystal unit 201 through the current applying unit 202, and the second sensing region 118 is a region formed by a section of the liquid crystal unit 201 to which current is no longer supplied.

The width of the second sensing region 118 corresponds to the width of each section of the liquid crystal unit 201, and the second sensing region 118 moves in the tangential direction of the first sensing region 116. Accordingly, the location of the second sensing region 118 varies sequentially depending on flow of current that is applied to the liquid crystal unit 201.

As illustrated in FIG. 10, the second sensing region 118 moves from a region D to a region E, from the region E to a region F, then from the region F to the region E, and from the region E to the region D as if it rotates reciprocatingly. In this way, the liquid crystal unit 201 and the current applying unit 202 perform the same function as the rotary motor 119 of FIG. 3.

Figure 11:
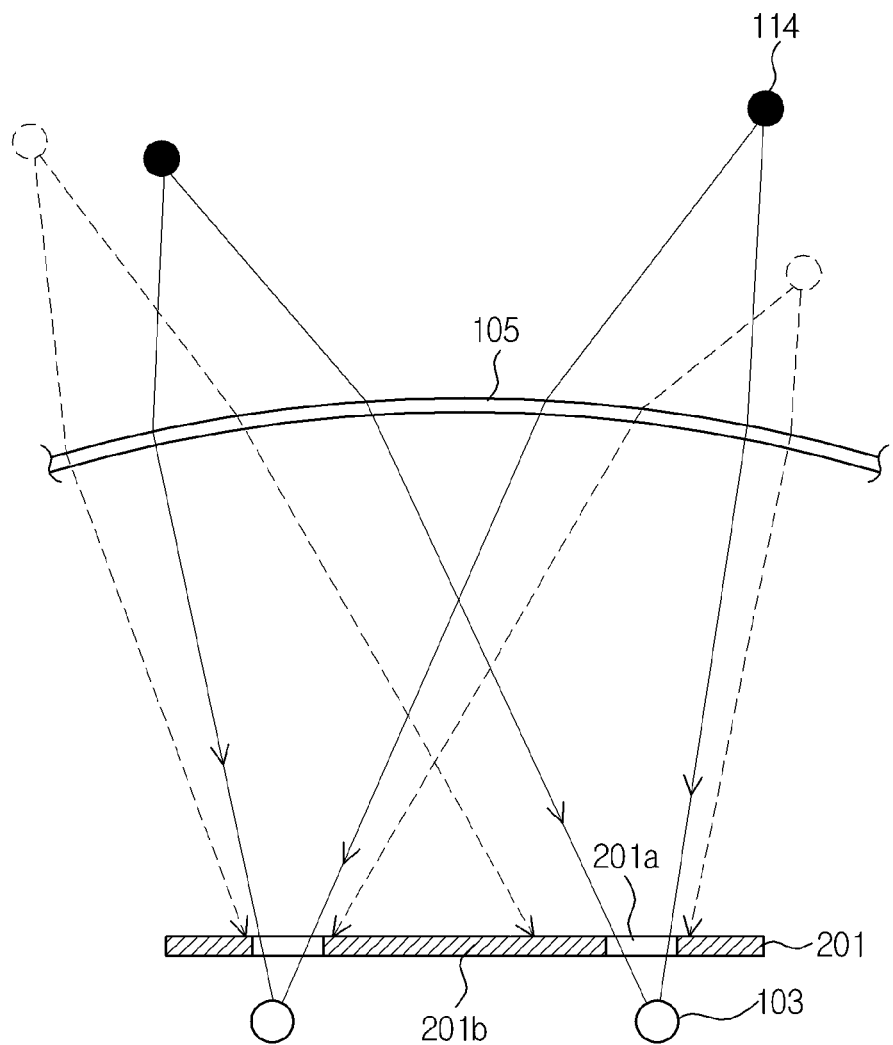
FIG. 11 is a conceptual view for describing a process in which rays generated from heat of human bodies arrive at human body-detecting sensors illustrated in FIG. 8.
Figure 12:
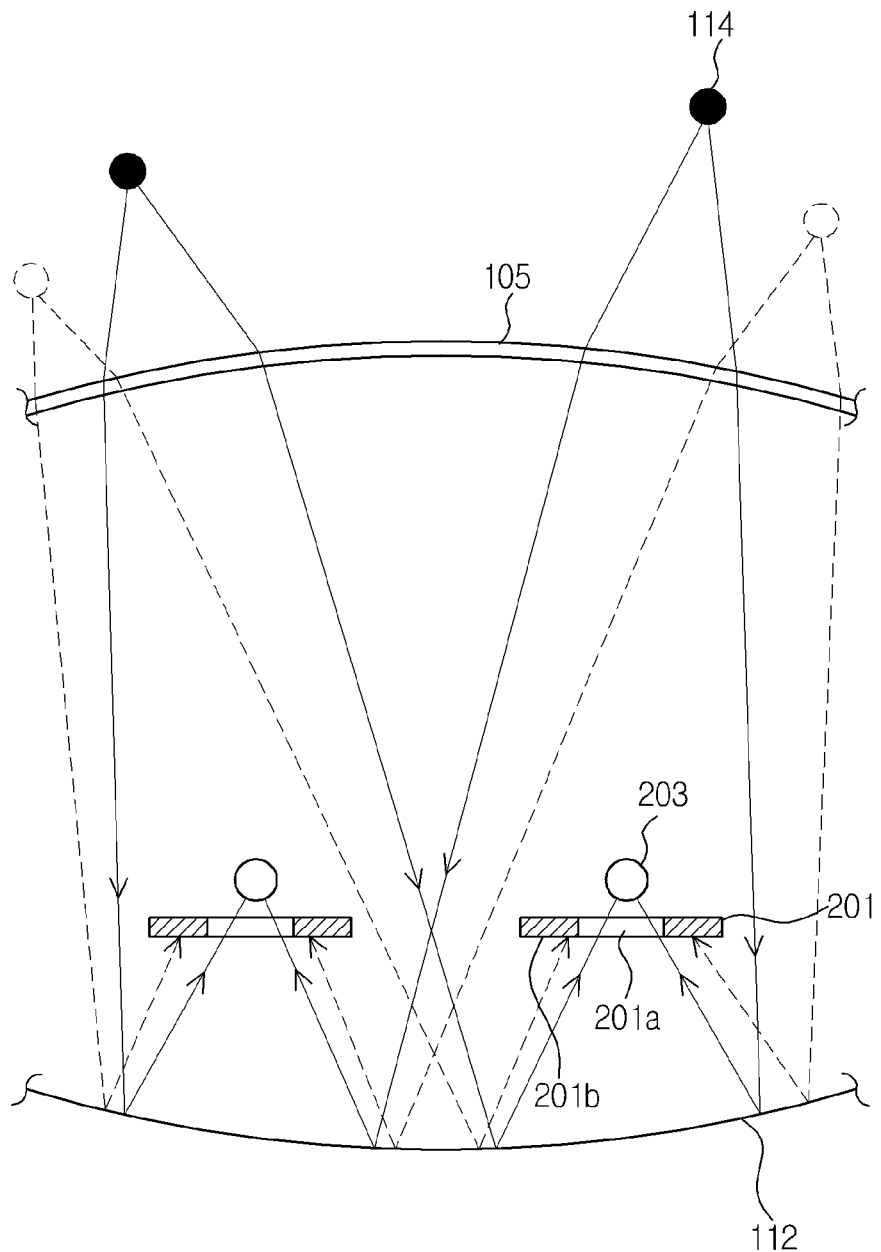
FIG. 12 is a conceptual view for describing a process in which rays generated from heat of human bodies arrive at the human body-detecting sensors via a reflector and the sensor module of FIG. 8.

FIGS. 11 and 12 are views for describing a process in which rays emitted from heat of human bodies 114 are transmitted through the moving object sensing lens 105 (and the liquid crystal unit 201 and then transferred to the human body-detecting sensors 203 in detail. An example of FIG. 12 is different from an example of FIG. 11 in that a reflector 112 is used.

Referring to FIG. 11, the sensing surfaces of the human body-detecting sensors 203 face the moving object sensing lens 105. Accordingly, rays emitted from the human bodies 114 are transmitted through and collected by the moving object sensing lens 105, and the collected rays are transmitted through the transparent sections 201a of the liquid crystal unit 201 and transferred to the human body-detecting sensors 203.

Referring to FIG. 12, when the reflector 112 is positioned behind the human body-detecting sensors 203, the sensing faces of the human body-detecting sensors 203 face the reflector 112 instead of the moving object sensing lens 105. Accordingly, rays emitted from heat of the human bodies 114 are transmitted through and collected by the moving object sensing lens 105, the collected rays are reflected against the reflector 112, and the reflected rays are transmitted through the transparent sections 201a of the liquid crystal unit 201 and then transferred to the human body-detecting sensors 203.

The reflector 112 has been described above, and accordingly further descriptions thereof will be omitted.

Referring again to FIG. 8, the controller 221 sets a sensing mode of the human body-detecting sensors 203 according to the results of sensing by the human body-detecting sensors 203, and adjusts the operation and sensing region of the human body-detecting sensors 203 according to the sensing mode.

In the current exemplary embodiment, the controller 221 controls the liquid crystal unit 201 and the current applying unit 202 to set a sensing mode. More specifically, when the air conditioner 200 is turned off, the controller 221 causes a small amount of current to flow through the entire sections of the liquid crystal unit 201. If a small amount of current flows through the liquid crystal unit 201, the liquid crystal unit 201 becomes opaque so as to block heat.

However, when the air conditioner 200 is in an operating mode, the controller 221 blocks the small amount of current applied to the liquid crystal unit 201. If current is no longer applied to the liquid crystal unit 201, the entire liquid crystal unit 201 becomes transparent so as to transmit rays emitted from heat of the human bodies 114.

As such, when the air conditioner 200 operates, a sensing mode of the air conditioner 200 is set. When the first sensing mode is set, the human body-detecting sensors 203 are fixed to monitor the first sensing region 116, and when the second sensing mode is set, the human body-detecting sensors 203 monitors the second sensing region 118.

When the air conditioner 200 starts to operate, the human body-detecting sensors 203 is set to the first sensing mode, and when the human body-detecting sensors 203 has detected a human body in the first sensing mode, the human body-detecting sensors 203 enter the second sensing mode.

In the second sensing mode, the second sensing region 118 moves in the left-right direction according to flow of current applied to the liquid crystal unit 201 in the first sensing region 116 so as to monitor the first sensing region 116.

When the human body-detecting sensors 203 has detected a human body, the controller 221 may calculate angles formed between the human body and the human body-detecting sensors 203, and calculate a distance from the human body-detecting sensors 203 to the human body 114 based on the calculated angles. The calculations by the controller 221 and a method of setting the direction and speed of wind according to the location of the human body have been described above, and accordingly, further descriptions thereof will be omitted.

Figure 13:
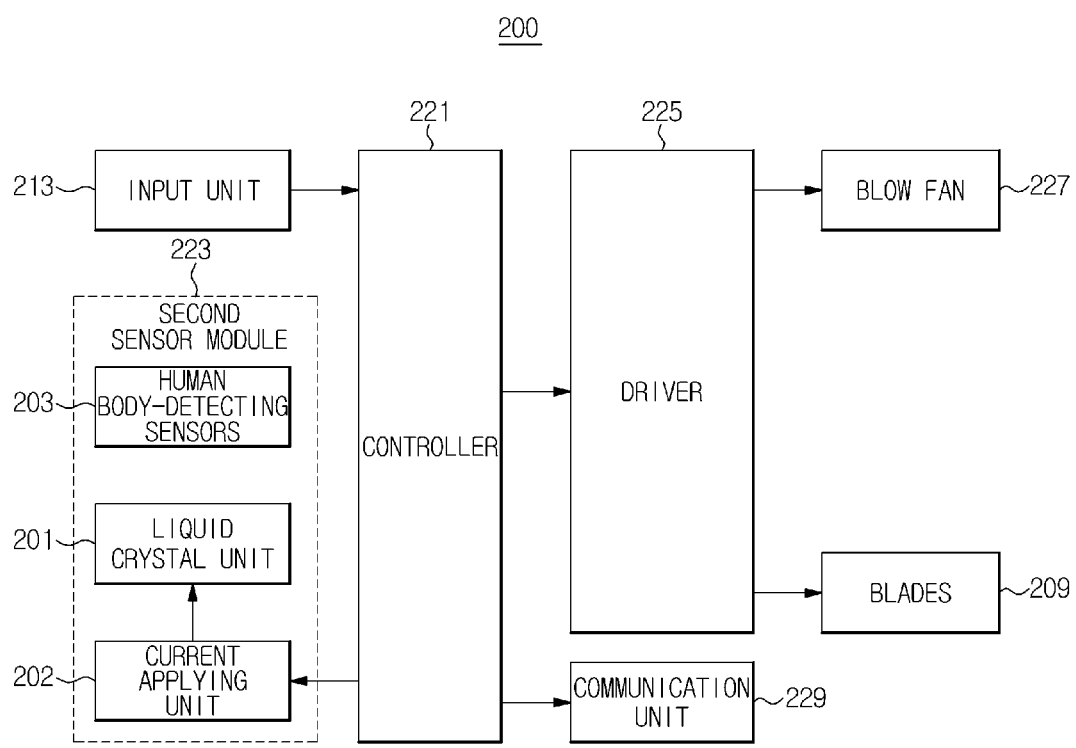
FIG. 13 a block diagram of an air conditioner including the sensor module illustrated in FIG. 8, which is used as a security sensor, according to another exemplary embodiment of the present disclosure.

FIG. 13 is a block diagram of an air conditioner 200 including a second sensor module 223, which is used as a security sensor, according to another exemplary embodiment of the present disclosure.

Referring to FIG. 13, the air conditioner 200 may include a communication unit 229 to notify a user of the fact that a human body has been detected, in addition to the components illustrated in FIG. 8. Accordingly, the air conditioner 200 may be used as a security sensor.

When a security mode is set, the human body-detecting sensors 203 may operate in the same way as the first sensing mode since only whether or not a human body exists in the first sensing region 116 is important information. However, in the current exemplary embodiment, the liquid crystal unit 201 is disposed in front of the human body-detecting sensors 203, and the liquid crystal unit 201 blocks current to transmit rays emitted from heat of a human body collected in all directions so that the rays arrive at the human body-detecting sensors 203.

Figure 14:
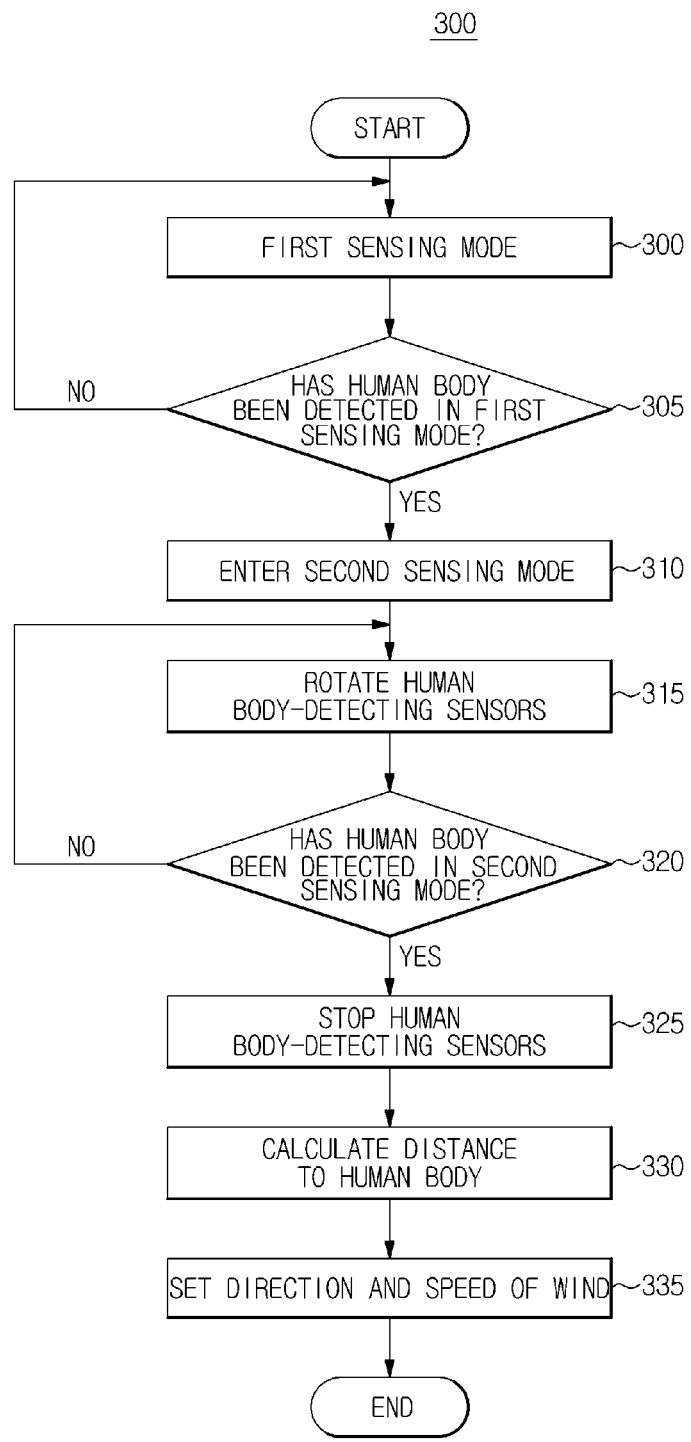
FIG. 14 is a flowchart illustrating a control method of the air conditioner illustrated in FIG. 3, according to an exemplary embodiment of the present disclosure.

FIG. 14 is a flowchart illustrating a control method of the air conditioner 100 illustrated in FIG. 3, according to an exemplary embodiment of the present disclosure.

Referring to FIGS. 2, 3, and 14, the human body-detecting sensors 103 monitor the first sensing region 115 in a first sensing mode to determine whether a human body exists in the first sensing region 115 (300 and 305). The first sensing region 115 is a fixed wide sensing region in which the human body-detecting sensors 103 detect a human body.

If no human body is detected in the first sensing region 115, the human body-detecting sensors 103 continue to monitor the first sensing region 115 while maintaining the first sensing mode.

If a human body has been detected in the first sensing mode, the human body-detecting sensors 103 enter a second sensing mode (310). In the second sensing mode, the sensing region of the human body-detecting sensors 103 is set to the second sensing region 117, and the human body-detecting sensors 103 rotate in the left-right direction (315).

Thereafter, it is determined whether a human body is detected in the second sensing mode (320). If no human body is detected in the second sensing mode, the human body-detecting sensors 103 rotate in a tangential direction while maintaining the second sensing mode.

If a human body has been detected in the second sensing mode, the human body-detecting sensors 103 are stopped (325), and a distance from the human body-detecting sensors 103 to the human body is calculated based on the distance between the human body-detecting sensors 103 and angles α and β formed between the human body and the human body-detecting sensors 103 (330).

The distance from the human body-detecting sensors 103 to the human body may be calculated using the trigonometrical function based on the stereo method. That is, the fact that distances from a plurality of human body-detecting sensors to feet of perpendicular of the human body-detecting sensors with respect to a straight line that is parallel to another straight line connecting the human body-detecting sensors to each other and passes through a human body are the same will be used, and further descriptions thereof will be omitted.

Then, the direction and speed of wind to be discharged from the air conditioner 100 are set according to the distance from the human body-detecting sensors 103 to the human body (335).

For example, a blowing direction of the air conditioner 100 is adjusted to a left, front, or right direction according to where human body is positioned.

As another example, a low speed of wind is set when a human body is positioned at a distance of 1 m from the air conditioner 100, a middle speed of wind is set when a human body is positioned at a distance of 2 m from the air conditioner 100, and a high speed of wind is set when a human body is positioned at a distance of 3 m or more from the air conditioner 100.

Figure 15:
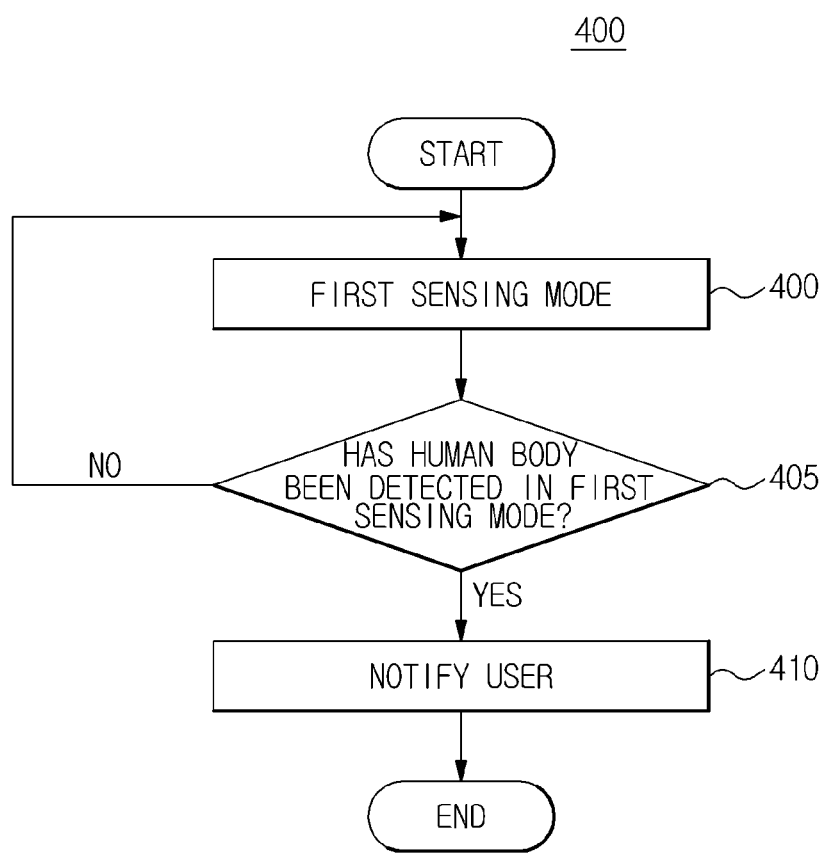
FIG. 15 is a flowchart illustrating a control method of the air conditioner illustrated in FIG. 7, according to an exemplary embodiment of the present disclosure.

FIG. 15 is a flowchart illustrating a control method of the air conditioner 100 used as a security sensor, according to an exemplary embodiment of the present disclosure.

Referring to FIGS. 2, 7, and 15, the human body-detecting sensors 103 monitors the first sensing region 115 in the first sensing mode to determine whether a human body exists in the first sensing region 115 (400 and 405), and outputs the results of the determination to the controller 121.

If no human body is detected in the first sensing mode, the human body-detecting sensors 103 continue to monitor the first sensing region 115 while maintaining the first sensing mode.

If a human body has been detected in the first sensing mode, the communication unit 129 notifies a user of the fact that a human body has been detected through the user's communication terminal (410).

Figure 16:
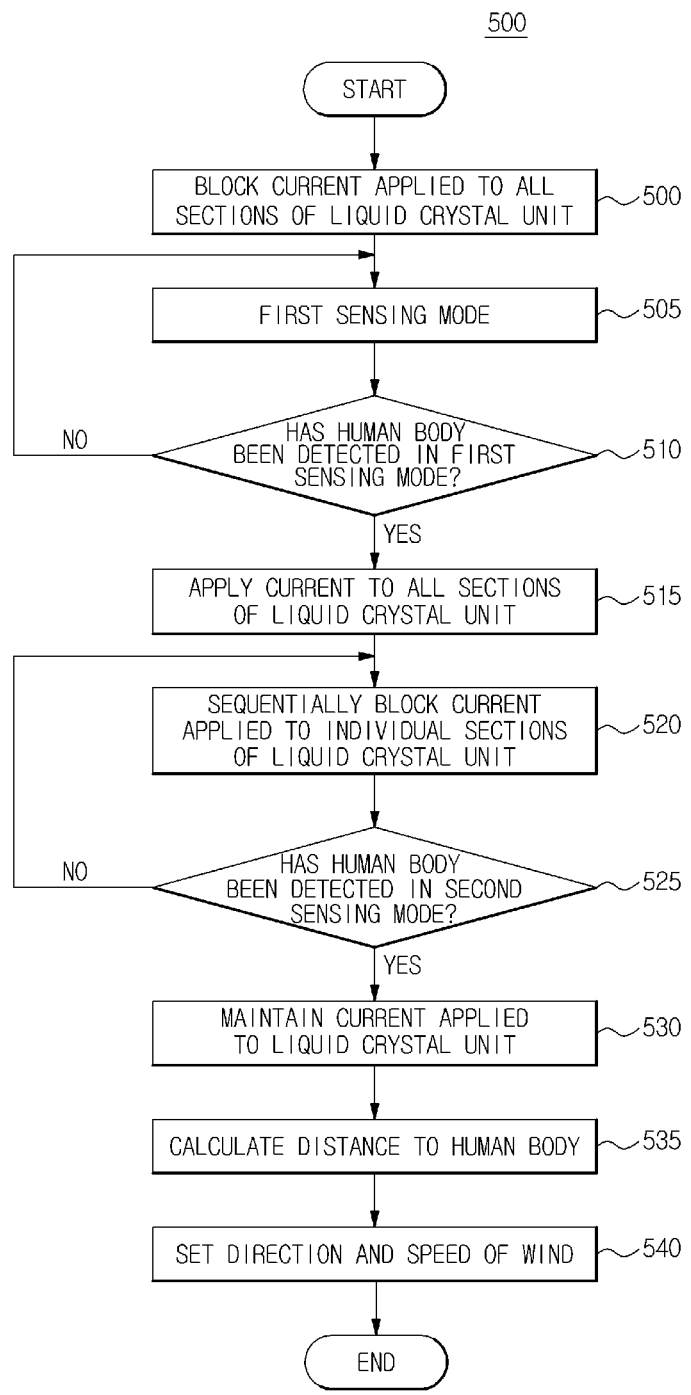
FIG. 16 is a flowchart illustrating a control method of the air conditioner illustrated in FIG. 8, according to another exemplary embodiment of the present disclosure.

FIG. 16 is a flowchart illustrating a control method of the air conditioner 200 illustrated in FIG. 8, according to another exemplary embodiment of the present disclosure.

Referring to FIGS. 8, 10, and 16, when the air conditioner 200 starts to operate, current that is applied to the individual sections of the liquid crystal unit 201 is blocked (500) so that all the sections of the liquid crystal unit 201 become transparent. Then, the human body-detecting sensors 203 monitor the first sensing region 116 which is a wide sensing region in the first sensing mode to determine whether a human body exists in the first sensing region 116 (505 and 510).

If no human body is detected in the first sensing mode, the human body-detecting sensors 203 continue to monitor the first sensing region 116 while maintaining the first sensing mode.

If a human body has been detected in the first sensing mode, the human body-detecting sensors 203 enter the second sensing mode to apply current to all the sections of the liquid crystal unit 201 (515) and then to sequentially block current applied to the respective sections of the liquid crystal unit 201 (520).

If no human body is detected in the second sensing mode, the human body-detecting sensors 203 rotate in a tangential direction while maintaining the second sensing mode to determine whether a human body exists in the second sensing region 118 (525).

If a human body has been detected in the second sensing region 118, current applied to the liquid crystal unit 201 is maintained (530), and a distance from the human body-detecting sensors 203 to the human body is calculated based on the distance between the human body-detecting sensors 203 and angles α and β formed between the human body and the human body-detecting sensors 203 (535).

The distance from the human body-detecting sensors 103 to the human body may be calculated using the trigonometrical function based on the stereo method, and further descriptions thereof will be omitted.

Then, the direction and speed of wind to be discharged from the air conditioner 200 are set based on the distance from the human body-detecting sensors 203 to the human body (540).

Figure 17:
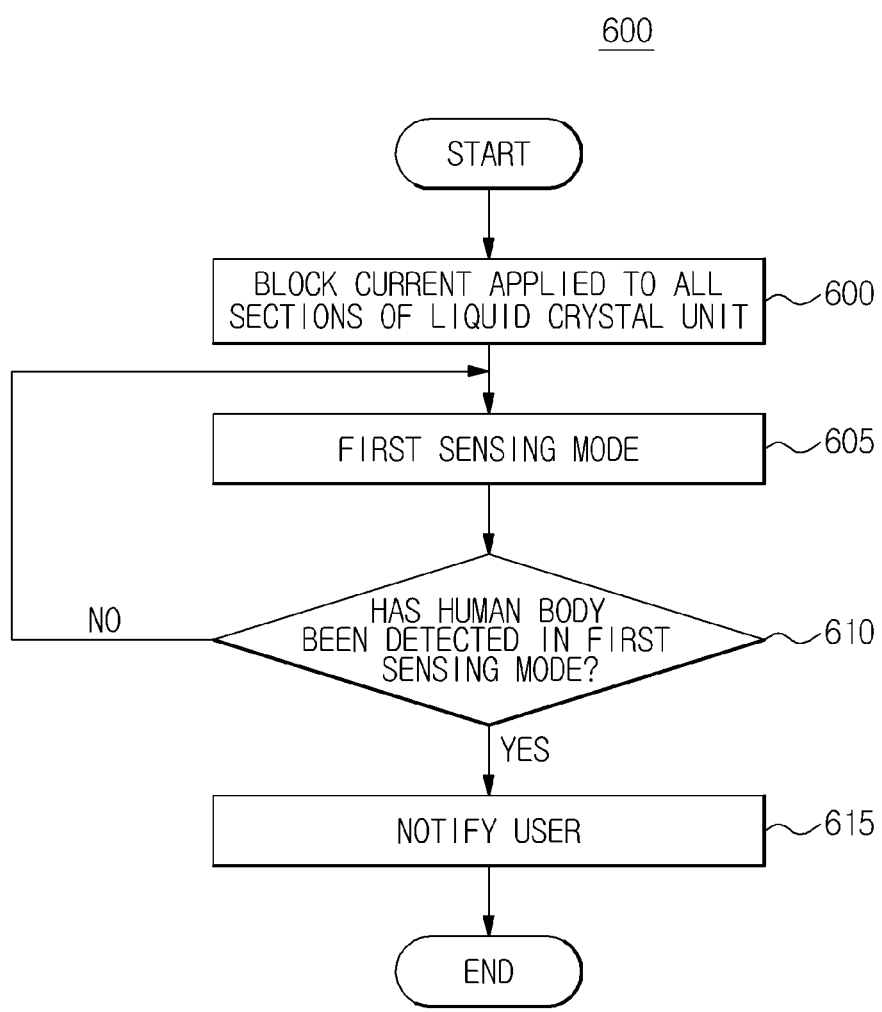
FIG. 17 is a flowchart illustrating a control method of the air conditioner illustrated in FIG. 13, according to another exemplary embodiment of the present disclosure.

FIG. 17 is a flowchart illustrating a control method of the air conditioner 200 including the liquid crystal unit 201, which is used as a security sensor, according to another exemplary embodiment of the present disclosure.

Referring to FIGS. 10, 13, and 17, when the air conditioner 200 starts to operate, current that is applied to the individual sections of the liquid crystal unit 201 is blocked (600) so that all the sections of the liquid crystal unit 201 become transparent. Then, the human body-detecting sensors 203 monitor the first sensing region 116 in the first sensing mode to determine whether a human body exists in the first sensing region 116 (605 and 610).

If no human body is detected in the first sensing mode, the human body-detecting sensors 203 continue to monitor the first sensing region 116 while maintaining the first sensing mode.

If a human body has been detected in the first sensing mode, the communication unit 229 notifies a user of the fact that a human body has been detected through the user's communication terminal (615).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
 a plurality of human body-detecting sensors configured to detect a human body;
 a blade configured to change a direction of a wind produced by the air conditioner;
 a blow fan configured to change a speed of the wind; and
 a controller configured:
   to perform a first sensing mode for detecting the human body,
   to perform a second sensing mode in which a narrower region than in the first sensing mode is monitored when the human body has been detected in the first sensing mode, and
   to adjust, when the human body has been detected in the second sensing mode, at least one of the blade and the blow fan to respectively change at least one of the direction and the speed of wind according to a direction in which the detected human body is positioned and a distance from the human body-detecting sensors to the human body,
 wherein a first sensing region in which the human body is detected in the first sensing mode is a fixed region, and
 a second sensing region in which the human body is detected in the second sensing mode is a part of the first sensing region, and is a sensing region that is relatively narrow with respect to the fixed region and whose location changes in a tangential direction over time.

2. The air conditioner according to claim 1, further comprising a reflector configured to reflect rays emitted from the human body and transfer the reflected rays to the human body-detecting sensors.

3. The air conditioner according to claim 1, further comprising communicator,
 wherein when a human body has been detected in the first sensing region, the communicator notifies a user of the fact that the human body has been detected.

4. An air conditioner comprising:
 a plurality of human body-detecting sensors configured to detect a human body;
 a blade configured to change a direction of a wind produced by the air conditioner;
 a blow fan configured to change a speed of the wind;
 a plurality of liquid crystals configured to block or transmit rays emitted from the detected human body;
 a current applying circuit including a plurality of switches configured to allow a flow of current to respective ones of the plurality of liquid crystals or to block the flow of current to respective ones the plurality of liquid crystals; and
 a controller configured:
   to perform a first sensing mode to detect the human body,
   to perform a second sensing mode in which a narrower region than in the first sensing mode is monitored when the human body has been detected, and
   to control at least one of the blade and the blow fan to adjust, when the human body has been detected in the second sensing mode, at least one of the direction and the speed of wind according to a direction in which the detected human body is positioned and a distance from the human body-detecting sensors to the detected human body.

5. The air conditioner according to claim 4, wherein the liquid crystals are divided into a plurality of sections, and the liquid crystals form a first sensing region by transmitting rays emitted from a human body when current is no longer applied to all the sections of the liquid crystals, and forms a second sensing region when current is applied to all the sections of the liquid crystals and then current applied to a section of the liquid crystals is blocked.

6. The air conditioner according to claim 5, wherein the first sensing region in which the human body is detected in the first sensing mode is a fixed sensing region, and
a second sensing region in which the human body is detected in the second sensing mode is a part of the first sensing region, and is a sensing region that is narrower than the fixed whose location changes in a tangential direction over time.

7. The air conditioner according to claim 4, further comprising a reflector configured to reflect rays emitted from the human body and transfer the reflected rays to the human body-detecting sensors.

8. The air conditioner according to claim 4, further comprising a communicator,
wherein when a human body has been detected in the first sensing region, the communicator notifies a user of the fact that a human body has been detected.

9. A control method of an air conditioner, comprising:
determining whether a human body exists in a first sensing region relative to the air conditioner;
when the human body has been detected in the first sensing region, determining whether the human body exists in a second sensing region relative to the air conditioner having a narrower width than that of the first sensing region;
when the human body has been detected in the second sensing region, setting a direction and a speed of a wind generated by the air conditioner according to at least one of a direction in which the detected human body is positioned and a distance from human body-detecting sensors of the air conditioner to the detected human body; and
at a rotary motor of the air conditioner, reciprocatingly rotating the human body-detecting sensors of the air conditioner in a tangential direction in the second sensing mode.

10. The control method according to claim 9, wherein a first sensing region in which a human body is detected in the first sensing mode is a fixed region, and
a second sensing region in which the human body is detected in the second sensing mode is a part of the first sensing region, and is a sensing region that is narrower than the wide region and whose location changes in a tangential direction over time.

11. The control method according to claim 9, further comprising, at a reflector of the air conditioner, reflecting rays emitted from the human body and transferring the reflected rays to the human body-detecting sensors.

12. The control method according to claim 9, further comprising at a communicator, notifying, when the human body has been detected in the first sensing region, a user of the fact that a human body has been detected.

13. A control method of an air conditioner, comprising:
at a plurality of liquid crystal crystals, blocking or transmitting rays emitted from a human body;
at a current applying circuit, applying a flow of current to the plurality of liquid crystals or blocking a flow of current that is applied to the plurality of liquid crystal crystals;
determining whether a human body exists in a first sensing region in a first sensing mode;
switching the first sensing mode to a second sensing mode when the human body has been detected, the second sensing mode monitoring a narrower region than the first sensing mode;
when a human body has been detected in the second sensing mode, recognizing a direction in which the human body is positioned and calculating a distance to the human body from the air conditioner; and
setting at least one of a direction a wind and a speed of the wind according to the direction in which the human body is positioned and the distance to the human body from the air conditioner.

14. The control method according to claim 13, wherein the liquid crystals are divided into a plurality of sections, and
the liquid crystal crystals form a first sensing region by transmitting rays emitted from a human body when current is no longer applied to all of the plurality of sections of the plurality of liquid crystals, and forms a second sensing region when current is applied to all the sections of the liquid crystals and then current applied to a section of the liquid crystals is blocked.

15. The control method according to claim 13, wherein a first sensing region in which the human body is detected in the first sensing mode is a fixed relatively wide region, and
a second sensing region in which a human body is detected in the second sensing mode is a part of the first sensing region, and is a relatively narrow sensing region whose location changes in a tangential direction over time.

16. The control method according to claim 13, further comprising, at a reflector, reflecting rays emitted from a human body and transferring the reflected rays to the human body-detecting sensors.

17. The control method according to claim 13, further comprising at a communicator, notifying, when a human body has been detected in the first sensing region, a user of the fact that a human body has been detected.

* * * * *